United States Patent [19]
Ira

[11] Patent Number: 5,846,172
[45] Date of Patent: Dec. 8, 1998

[54] AUTOMATIC ATTACHMENT EXCHANGE APPARATUS

[75] Inventor: Hiroshi Ira, Numazu, Japan

[73] Assignee: Toshiba Kikai Kabushiki Kaisha, Tokyo-to, Japan

[21] Appl. No.: 834,178

[22] Filed: Apr. 15, 1997

[30] Foreign Application Priority Data

Jun. 28, 1996 [JP] Japan .................................. 8-169136

[51] Int. Cl.⁶ ................................................. B23Q 3/155
[52] U.S. Cl. ................................. 483/31; 483/51; 483/69
[58] Field of Search ................................. 483/54, 55, 56, 483/51, 69, 901, 16, 31; 248/51; 901/41, 42, 43

[56] References Cited

U.S. PATENT DOCUMENTS

| | | | |
|---|---|---|---|
| 4,583,894 | 4/1986 | Mitchell | 483/31 X |
| 4,637,121 | 1/1987 | Wortmann | 483/16 |
| 4,705,243 | 11/1987 | Hartmann et al. | 248/51 |
| 5,454,775 | 10/1995 | Cullen et al. | 483/69 X |

FOREIGN PATENT DOCUMENTS

| | | | |
|---|---|---|---|
| 234825 | 4/1986 | German Dem. Rep. | 901/41 |
| 60-161045 | 8/1985 | Japan | 483/31 |
| 2106230 | 4/1990 | Japan | 901/41 |

*Primary Examiner*—William R. Briggs
*Attorney, Agent, or Firm*—Pillsbury Madison & Sutro LLP

[57] ABSTRACT

This invention makes it possible to freely exchange an attachment 20, to which is connected a flexible cable 21 used as an energy supply line and a signal line, on an end surface of a ram 13 of a spindle head of a machine tool having a plurality of control axes. Support means 26a, 26b, and 28 supports the cable in such a manner that this cable 21 can follow the motions of the spindle head. A conveyor means conveys the attachment between an attachment/detachment position at the end surface of the ram 13 and a position at which the attachment 20 is stored, with the cable 21 still connected thereto. The automatic attachment exchange apparatus of this invention automatically exchanges attachments while cables, such as energy supply cords and signal lines, are still connected to the attachments, thus resolving the inconvenience of connecting and disconnecting cables.

8 Claims, 6 Drawing Sheets

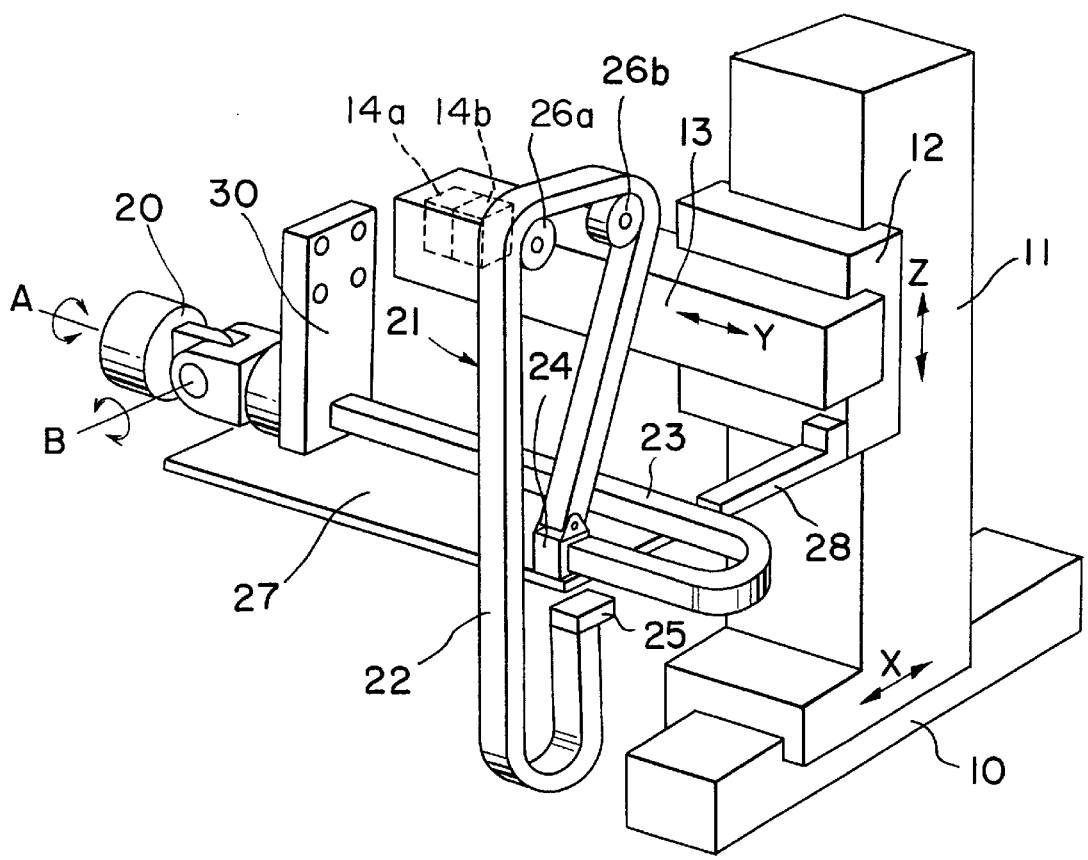
F I G. 1

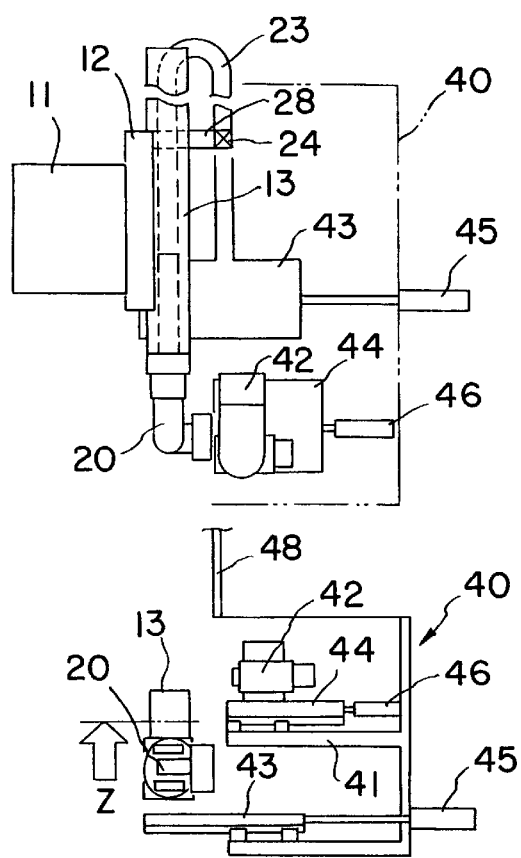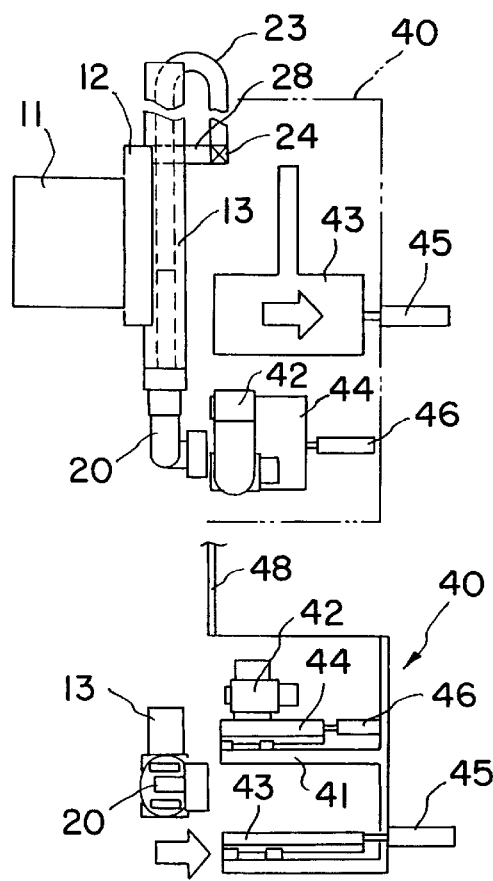
F I G. 5D　　　　F I G. 5E

AUTOMATIC ATTACHMENT EXCHANGE APPARATUS

BACKGROUND OF THE INVENTION

The present invention relates to an automatic attachment exchange apparatus; more specifically, it relates to an automatic attachment exchange apparatus that makes it possible to mount an attachment onto a spindle head in a state in which a cable comprising a power supply line or signal line is still connected thereto, and/or remove it therefrom.

A machine tool is provided with an apparatus that automatically exchanges various attachments that are mounted on a ram of a spindle head.

One example of a case in which this exchange of attachments is necessary occurs after machining with a multi-spindle head, where the multi-spindle head is exchanged for a instrumentation head that measures a three-dimensional surface formed on the workpiece. An automatic attachment exchange apparatus is capable of mounting an instrumentation head on the end surface of the ram in place of the multi-spindle head.

Of these attachments, an attachment such as an instrumentation head is connected to various cables. These cables are a power cable for supplying electrical power for the operation, hydraulic piping for supplying pressurized oil, and signal lines for transferring electrical signals between the attachment and the control unit.

When such an attachment to which cables are connected is exchanged in the prior art, it is necessary to connect and disconnect the power cables, hydraulic hoses, air hoses, and signal lines of the attachment, in an operation separate from the exchange of the attachment itself. Special connection couplings or connectors that are specific to the attachment are used as appliances for connecting such cables to the attachment. In the prior-art exchange of attachments, these cables are repeatedly connected and disconnected every time the attachments are mounted on the ram end surface or removed therefrom.

However, this repeated connection and disconnection of the cables of an attachment causes problems, as described below.

If the connected cable is hydraulic piping, the repeated connection and disconnection thereof leads to the danger of leakage of the hydraulic fluid, caused by deterioration of the packing of the couplings or the like. With electrical cables, frequent connection and disconnection causes friction in the pins of the connectors, leading to faulty connections. When an instrumentation head is exchanged as an attachment, repeated connection and disconnection of the signal lines to this instrumentation head could cause changes in the state of the signal transfer system. As a result, the measurement accuracy of the instrumentation head cannot be maintained, causing a problem concerning reliability.

SUMMARY OF THE INVENTION

An objective of the present invention is to provide an automatic attachment exchange apparatus whereby attachments can be exchanged automatically while cables, such as an energy supply cable and a signal line, are still connected thereto, without having to connect and disconnect the cables of the attachments.

To attain the above-described object, an automatic attachment exchange apparatus for attaching an attachment onto an end of a ram of a spindle head of a machine tool, and detaching the same therefrom, to exchange attachments; said automatic attachment exchange apparatus comprising:

support means for supporting a cable which is connected to an attachment, in such a manner that said cable is capable of following the motion of said spindle head; and conveyor means for conveying said attachment to and from between a location at which said attachment is attached or detached on the end of the ram and a location at which said attachment is stored, while said cable remains connected.

Since the automatic attachment exchange apparatus of the present invention enables automatic exchange of attachments with power cables and signal lines still connected thereto, there is no need to disconnect and reconnect cables during every exchange, as there is in the prior art, making it possible to maintain reliability without any inconvenience such as leakage of fluids, friction of connector pins, or changes in the signal transfer system. In particular, it is possible to maintain the measurement accuracy of an instrumentation head connected by signal lines.

In accordance with the invention, the cable connected to the attachment is a flexible cable used as an energy supply line and/or a signal line.

In accordance with a preferred embodiment of the invention the support means is provided with a number of relay means partway along the cable, in such a manner as to correspond with a plurality of controlled axes of the machine tool.

Moreover, the cable comprises a first cable and a second cable connected each other by the relay means, each supported by the support means in such a manner as to follow the motion of the spindle head in mutually perpendicular directions.

In accordance with a preferred embodiment of the invention, the support means comprises a pulley from which is suspended the first cable in such a manner as to follow vertical motion of the spindle head. The support means comprises a saddle arm which supports the second cable when the attachment has been mounted in the ram.

In accordance with other features, the conveyor means comprises a pallet which bears the attachment to which the cable is connected and which reciprocates between an attachment/detachment position and a standby position. The conveyor means is also provided with a pallet which bears another attachment to be replaced with and which reciprocates between an attachment/detachment position and a standby position.

BRIEF DESCRIPTION OF THE DRAWINGS

FIG. 1 is a perspective view of an embodiment of the automatic attachment exchange apparatus in accordance with the present invention, showing a state in which an instrumentation head is being removed from the ram as an attachment;

DESCRIPTION OF PREFERRED EMBODIMENT

An embodiment of an automatic attachment exchange apparatus in accordance with the present invention will now be described, with reference to the accompanying drawings.

Figure 2:
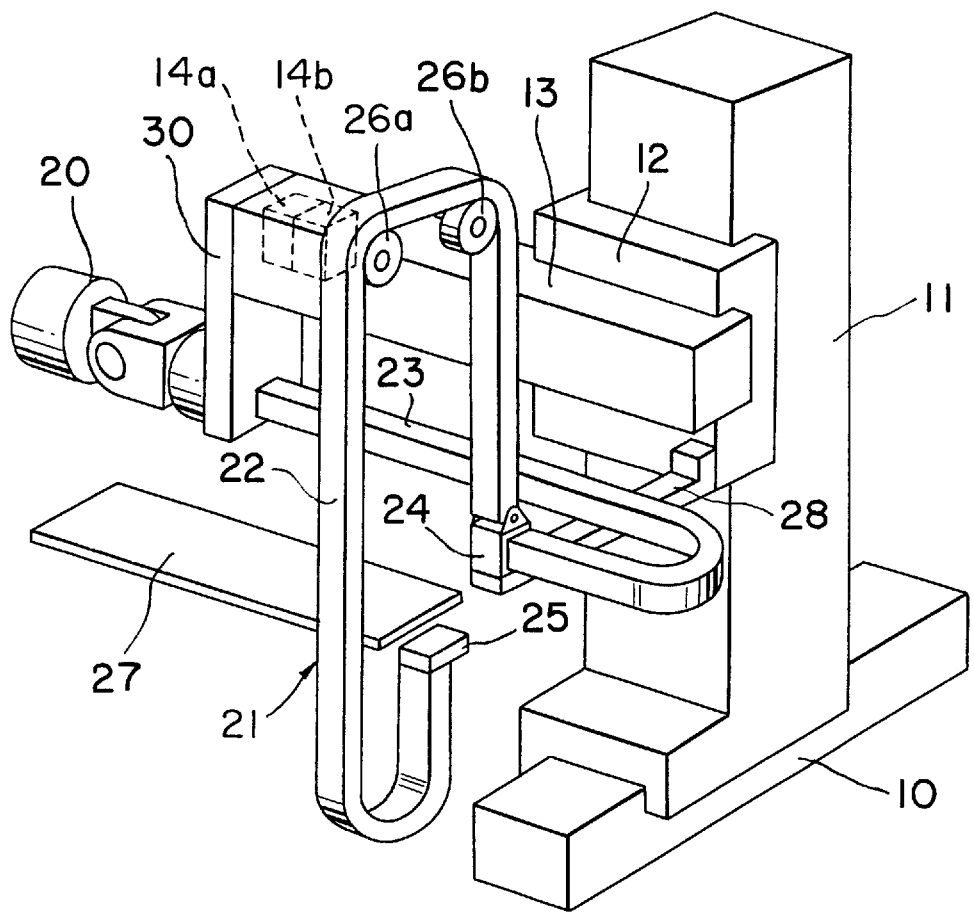
FIG. 2 is a perspective view of this embodiment of the automatic attachment exchange apparatus in accordance with the present invention, showing a state in which an instrumentation head is being mounted on the ram as an attachment.

A state in which an instrumentation head that is an attachment is being detached from a ram is shown in FIG. 1. A state in which the instrumentation head is being mounted on the ram is shown in FIG. 2. In this embodiment, an attachment mounted on an end of a ram of a horizontal boring machine is an instrumentation head to which are connected cables consisting of a power line for supplying electrical power and a signal line.

In FIGS. 1 and 2, reference number 10 denotes a bed of a machine tool. Reference number 11 denotes a column that is provided on the bed 10 in such a manner that it is capable of moving in an X-axis direction. A saddle 12 that rises and lowers in a Z-axis direction is attached to the column 11. A spindle head is configured of this saddle 12 and a ram 13 attached to the saddle 12. The ram 13 moves forward and backward in a Y□axis direction. The instrumentation head 20 is capable of rotating about an A axis and a B axis. A numerical controller that is not shown in the figures is capable of providing numerical control over the motions of the column 11, the saddle 12, the ram 13, and an instrumentation head 20 along the X axis, Y axis, Z axis, A axis, and B axis, which are control axes.

This instrumentation head 20 which can measure a three-dimensional curved surface of a work piece in which is installed a CCD camera. A cable 21 is a flexible cable comprising a cable that supplies electrical power to the instrumentation head 20 and a signal line that is connected to the CCD camera. This cable 21 remains connected to the instrumentation head 20 and is attached to an end surface of the ram 13. The instrumentation head 20 can be removed and exchanged for another attachment, while it is still connected to the cable 21. FIG. 1 shows a state before the instrumentation head 20 has been mounted onto the ram 13 and FIG. 2 shows a state in which the instrumentation head 20 is mounted on the ram 13. A known attachment/detachment device 14a that is used for mounting and removing an attachment of this type and a clamping device 14b for fixing the attachment are built into an end portion of the ram 13.

The cable 21 connected to the instrumentation head 20 is configured of two parts, a Z-axis cable 22 and a Y-axis cable 23, in such a manner that it can follow the motions of the ram 13, and each part is supported independently. The Z-axis cable 22 is connected to the Y-axis cable 23 by a relay box 24 that is used as relay means. A base end of the Z-axis cable 22 is connected to a fixed relay box 25 that is fixed to an support member which is not shown. The fixed relay box 25 is connected by a power line, which support the necessary electrical power, and a cable of the numerical controller, which is also not shown in the figures.

The Z-axis cable 22 is mainly supported by pulleys 26a and 26b, which act as support means, in such a manner that it bends to follow the motion of the axial head in the Z-axis direction. These pulleys 26a and 26b are capable of suspending the Z-axis cable 22 in a U-shape. During the process of exchanging attachments, the Y-axis cable 23 and the instrumentation head 20 are supported by a pallet (not shown in the figures) on a pedestal 27. The Y-axis cable 23 is supported in a J-shape in a horizontal orientation, in such a manner that it bends to follow the motion of the spindle head in the Y-axis direction. A saddle arm 28 supports the Y-axis cable 23 when the instrumentation head 20 has been mounted on the ram 13, as shown in FIG. 2. This saddle arm 28 is supported to extend horizontally from the saddle 12.

Note that reference number 30 in FIGS. 1 and 2 denotes an bracket for connecting and disconnecting the instrumentation head 20 and the ram 13.

Figure 3:
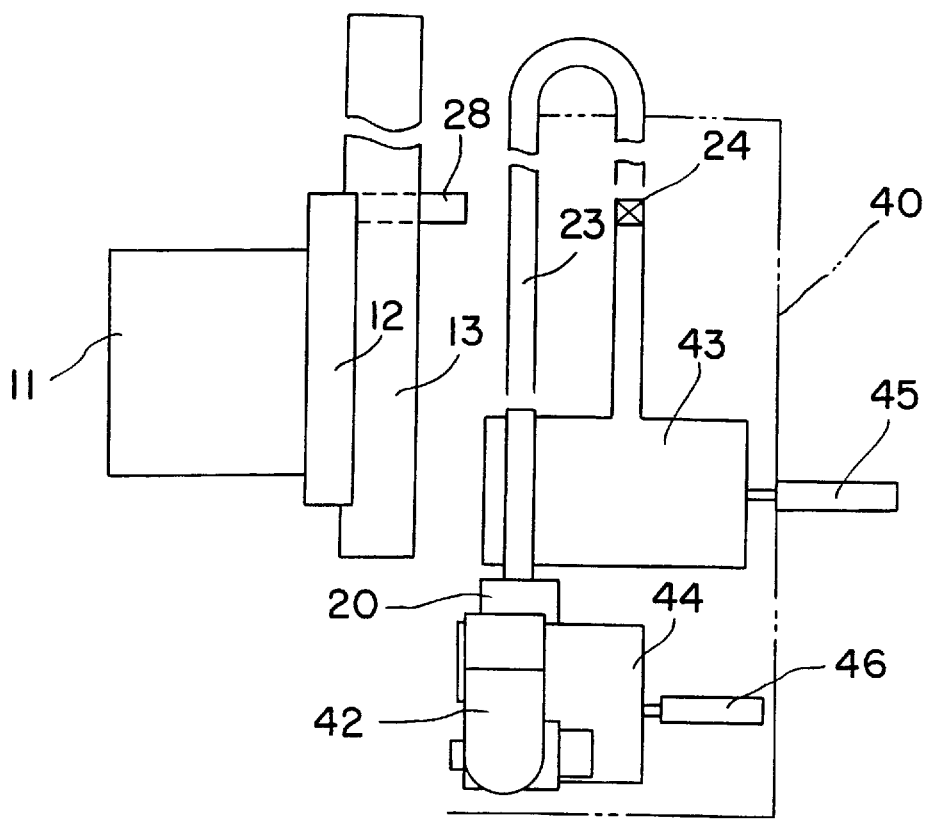
FIG. 3 is a plan view of a conveyor apparatus that conveys attachments.
Figure 4:
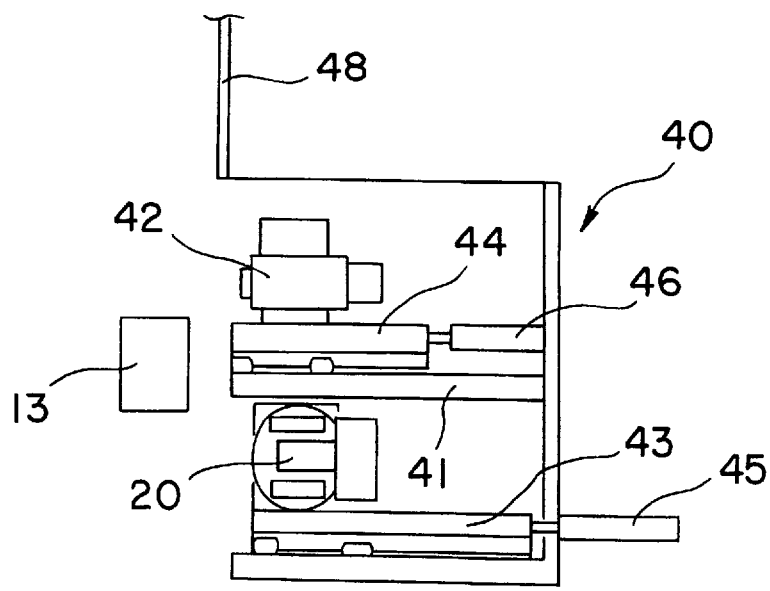
FIG. 4 is a side view of the conveyor apparatus of FIG. 3.

A plan view of the arrangement of a storage chamber 40 for attachments is shown in FIG. 3, and a side view of the storage chamber 40 is shown in FIG. 4.

This storage chamber 40 is divided vertically into two stages by a partition wall 41 that forms the pedestal 27 of FIGS. 1 and 2. In this embodiment, the lower stage is configured as a storage chamber for the instrumentation head 20 and the upper stage is configured as a storage chamber for a five-spindle head 42. Pallets 43 and 44 are provided in these storage chambers, respectively, to form conveyor means. The pallets 43 and 44, on which are borne attachments, are driven by cylinders 45 and 46, respectively, to move them forward and backward in the X-axis direction. In this embodiment, the instrumentation head 20 is borne on the pallet 43. The Y-axis cable 23 is connected to the instrumentation head 20 that is borne on the pallet 43, as shown in FIG. 3. During this time, the Z-axis cable 22 that is connected to the Y-axis cable 23 is suspended from the pulleys 26a and 26b, as shown in FIG. 1. The pallet 43 configured in this manner bears the instrumentation head 20 while it is still connected to the Z-axis cable 22 and the Y-axis cable 23, and is capable of moving between an attachment/detachment position on the ram 13 and a standby position within the storage chamber.

The operation of the thus configured automatic attachment exchange apparatus will now be described with reference to FIGS. 5A to 5G.

The automatic attachment exchange apparatus removes the five-spindle head 42 from the ram 13 and returns it to the pallet 44 in the upper storage chamber. The description below relates to the sequence of operations after the return of the five-spindle head up until the instrumentation head 20, which is stored on the pallet 43 of the lower storage chamber, is attached to the ram 13 while it is still connected to the cable 21.

Figure 5C:
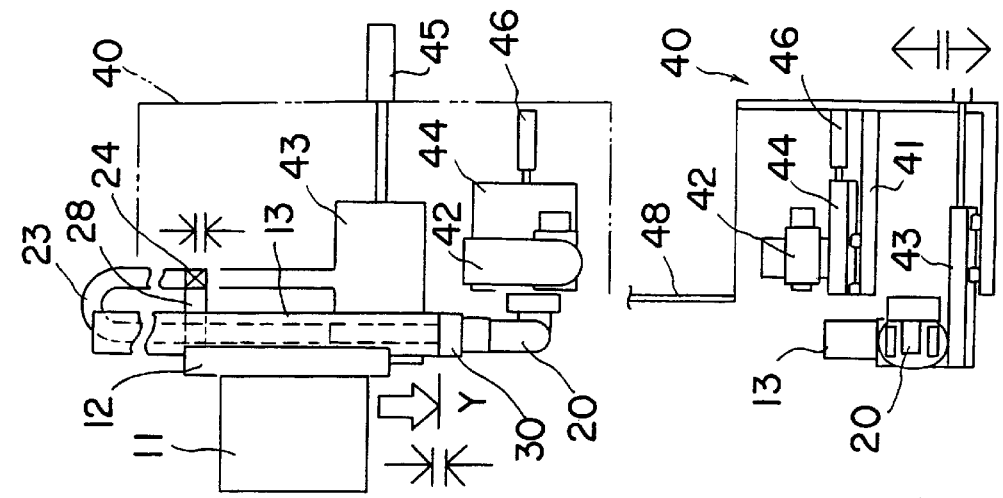
FIG. 5A through FIG. 5C shows views illustrative of the sequence of operations of the automatic attachment exchange apparatus, up to the conveying of the instrumentation head to a connection position of the ram.
Figure 5B:
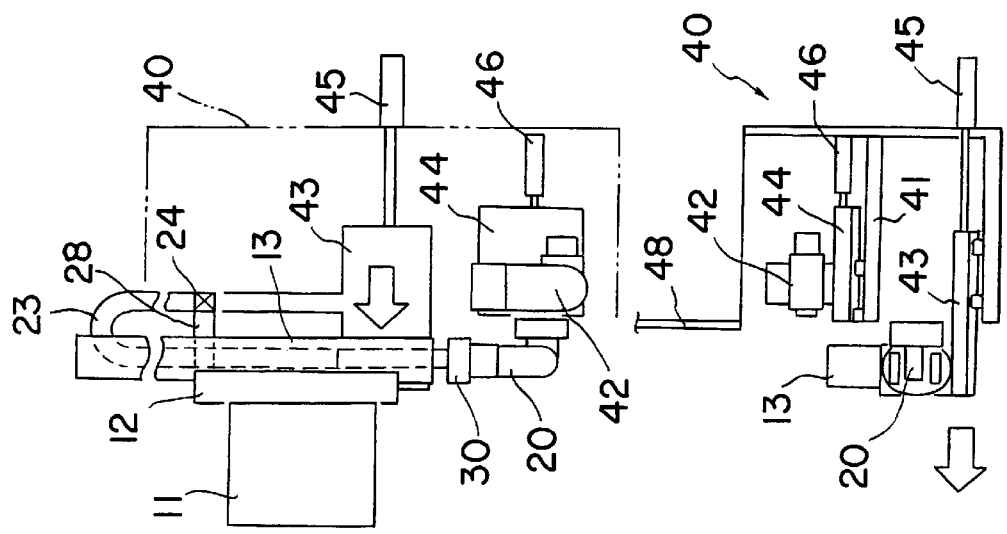
Figure 5A:
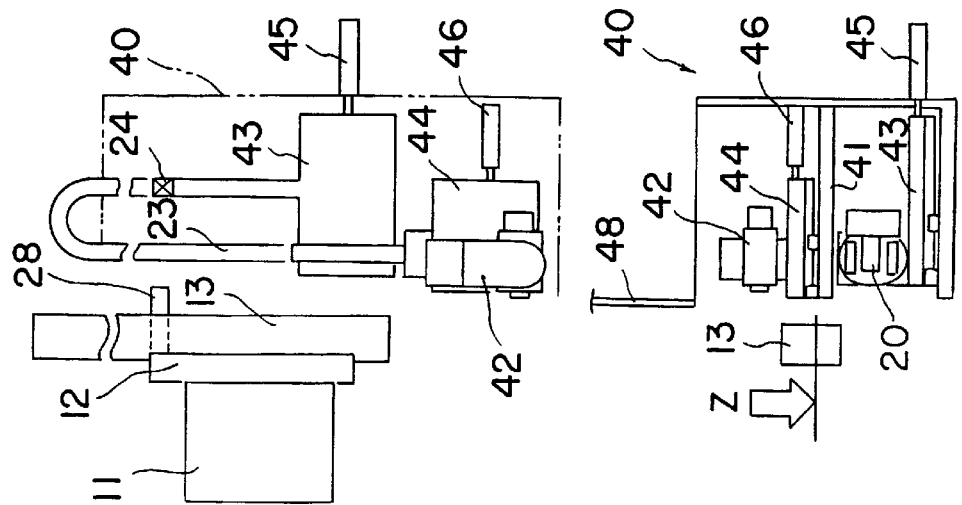

First of all, the ram 13 is in a standby state at an attachment exchange position, as shown in FIG. 5A.

Next, a piston rod of the cylinder 45 is extended to move the pallet 43 bearing the instrumentation head 20 forward, as shown in FIG. 5B. The pallet 43 conveys the instrumentation head 20 as far as the attachment/detachment position thereof on the ram 13. During this time, the Y-axis cable 23 that is connected to the instrumentation head 20 moves together with the relay box 24 and moves forward to a position at which it is clamped by the saddle arm 28.

The ram 13 moves forward, as shown in FIG. 5C, then an end surface of the ram 13 comes into contact with a bracket 30 attached to the instrumentation head 20. At this point, the instrumentation head 20 and the ram 13 are connected together by an attachment/detachment device 14a and a clamping device 14b built into the ram 13. The Y-axis cable 23 connected to the instrumentation head 20 is clamped by a clamping device (not shown in the figures) at the position of the relay box 24, in such a manner that it does not separate from the saddle arm 28.

The instrumentation head 20 is then unclamped from a clamping device (not shown in the figures) provided on the pallet 43 to fix the instrumentation head 20, as shown in FIG. 5D. The instrumentation head 20 that is now connected to the ram 13 rises together with the saddle 12.

Figure 5F:
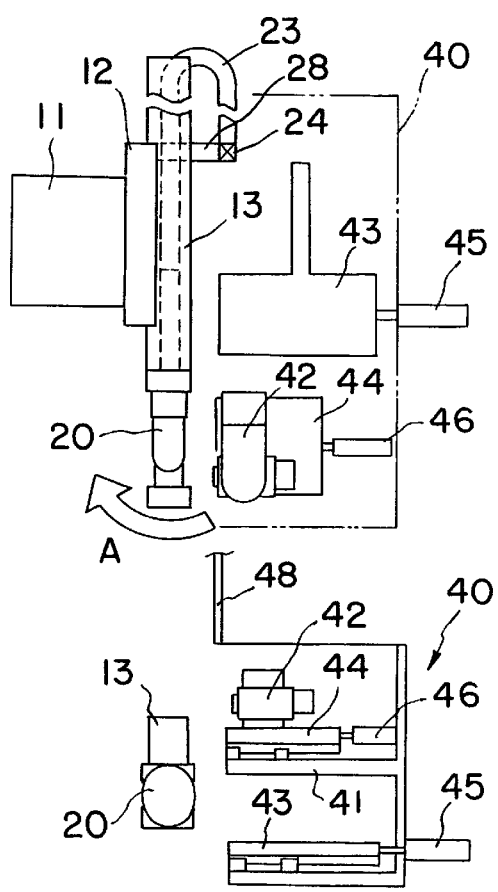
FIG. 5D and FIG. 5E shows views illustrative of the sequence of operations of the automatic attachment exchange apparatus, up to the mounting of the instrumentation head onto the ram; and FIG. 5F
FIG. 5G shows views illustrative of the sequence of operations of the automatic attachment exchange apparatus, up to the completion of the mounting of the instrumentation head onto the ram.
Figure 5G:
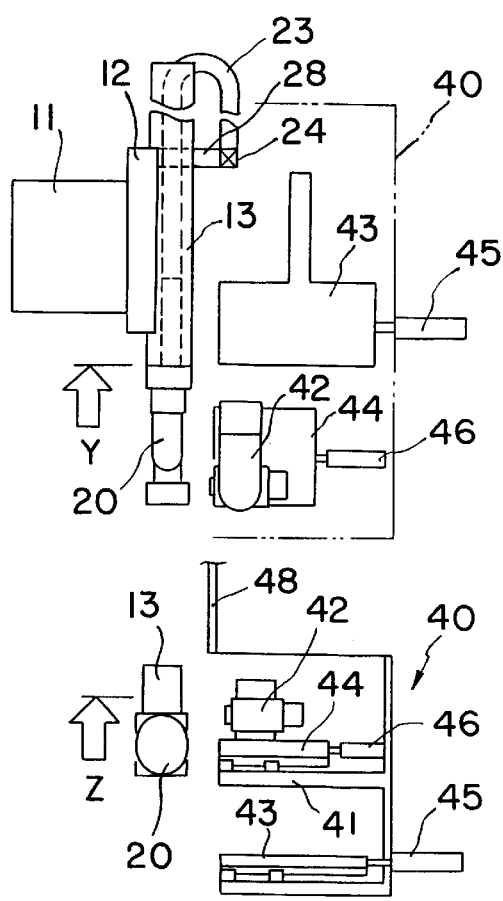

Subsequently, the pallet 43 retreats and returns to the storage chamber 40, as shown in FIG. 5E. At the same time, the instrumentation head 20 rotates about the A axis, as shown in FIG. 5F, to prevent it interfering with the storage chamber 40. Finally, the saddle 12 rises simultaneously with the retreat of the ram 13, as shown in FIG. 5G. This completes the attachment exchange operation that mounts the instrumentation head 20 onto the ram 13 with the cable 21 connected thereto.

Note that the operation of detaching the instrumentation head 20 could be performed by reversing the above sequence of operations.

As described above, the present invention makes it possible to mount an attachment onto the ram while it is still connected to a cable comprising a power supply cable and a signal line, and detach it therefrom. This differs from the prior art in which the cables must be connected and disconnected for each exchange. There is therefore no necessity to connect and disconnect cables every time the attachments are exchanged. Since it is possible for the attachments to be handled with the cables still connected thereto during the attachment exchange operation, this means that there are no inconveniences such as leakage of fluids from couplings, friction in the connector pins, or changes in the signal transfer system, even if the exchange of attachments is repeated. In particular, it is possible to maintain the measurement accuracy of an instrumentation head connected by signal lines.

What is claimed is:

1. An automatic attachment exchange apparatus for a machine tool system, the machine tool system comprising:

attachments including an attachment having a cable connected thereto;

a machine tool having a ram of a movable spindle head, said ram having an end to and from which one of the attachments is attached and detached; and storage means for storing the attachments;

the automatic attachment exchange apparatus comprising support means for supporting the cable thereon in such a manner to allow the cable to follow the spindle head when the spindle head is moved; and conveyor means for conveying the attachment between the end of the ram and the storage means, while the cable remains connected to the attachment and supported on the support means.

2. The automatic attachment exchange apparatus as defined in claim 1, wherein the cable connected to the attachment is a flexible cable used as an energy supply line and/or a signal line.

3. The automatic attachment exchange apparatus as defined in claim 2, wherein the support means is provided with a number of relay means partway along the cable, in such a manner as to correspond with a plurality of controlled axes of the machine tool.

4. The automatic attachment exchange apparatus as defined in claim 3, wherein the cable comprises a first cable and a second cable connected to each other by the relay means, each supported by the support means in such a manner as to follow the motion of the spindle head in mutually perpendicular directions.

5. The automatic attachment exchange apparatus as defined in claim 4, wherein the support means comprises a pulley from which is suspended the first cable in such a manner as to follow vertical motion of the spindle head.

6. The automatic attachment exchange apparatus as defined in claim 4, wherein the support means comprises a saddle arm which supports the second cable when the attachment has been mounted on the ram.

7. The automatic attachment exchange apparatus as defined in claim 1, wherein the conveyor means comprises a pallet which bears the attachment to which the cable is connected and which reciprocates between an attachment/detachment position and a standby position.

8. The automatic attachment exchange apparatus as defined in claim 7, wherein the conveyor means is also provided with a pallet which bears another attachment to be replaced and which reciprocates between an attachment/detachment position and a standby position.

* * * * *